United States Patent

Schleich

[15] 3,640,480
[45] Feb. 8, 1972

[54] SCROLL STRIPPING METHOD AND APPARATUS

[72] Inventor: Nicholas P. Schleich, Golf, Ill.
[73] Assignee: The Matix Corporation
[22] Filed: Mar. 9, 1970
[21] Appl. No.: 17,783

[52] U.S. Cl. .................................. 242/56, 83/208
[51] Int. Cl. ........................................ B65h 19/20
[58] Field of Search ...................... 242/56–56.5, 55; 83/208, 209

[56] References Cited

UNITED STATES PATENTS 3,160,047  12/1964  Malloy et al. .................. 83/208

Primary Examiner—Leonard D. Christian
Attorney—Harry P. Eichin

[57] ABSTRACT

An apparatus and method are provided for unwinding and guiding scrolls of microfilm from film cartridges while concurrently severing and separating the leader tape from the body of the unwound scroll.

14 Claims, 5 Drawing Figures

Inventor
Nicholas P. Schleich

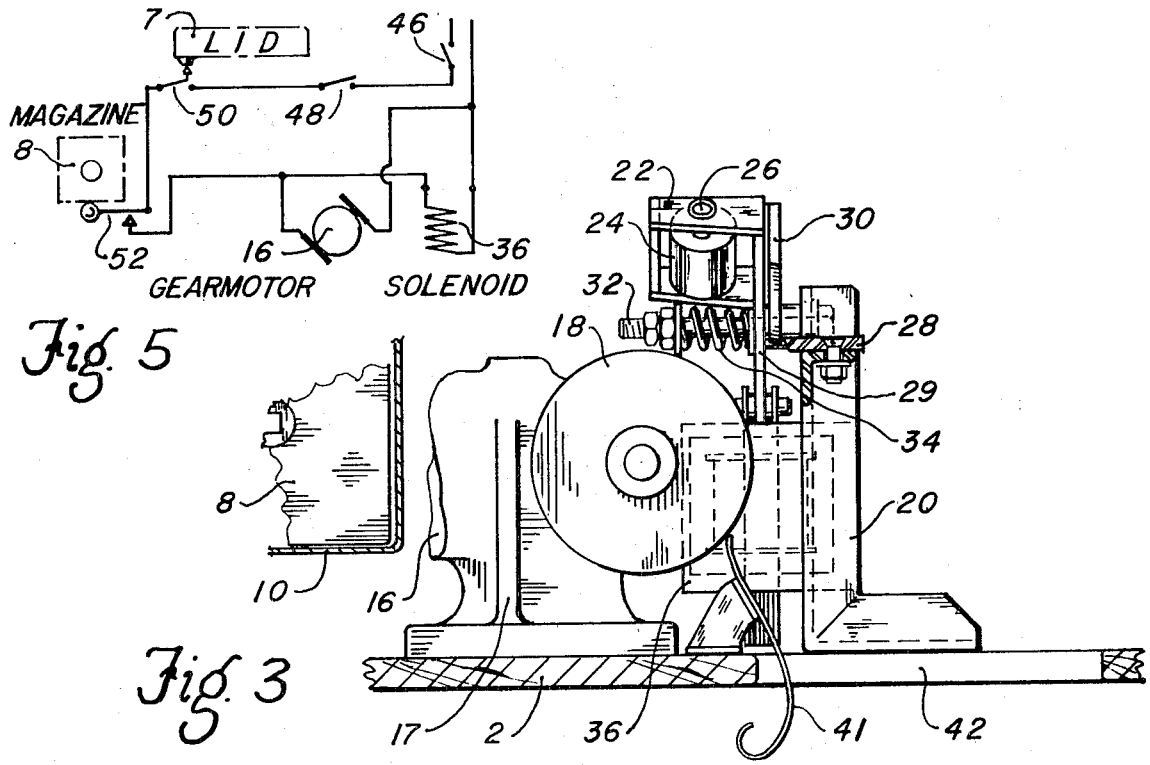
Fig. 5
Fig. 3
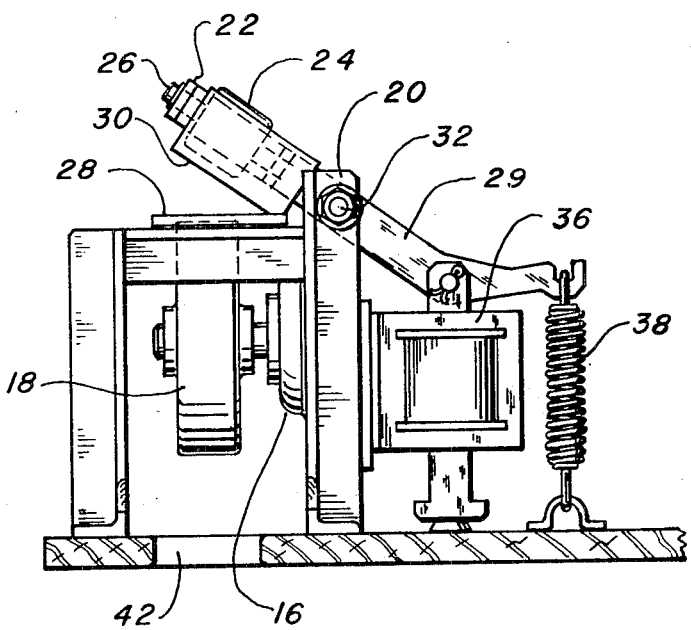
Fig. 4
Inventor
Nicholas P. Schleich

SCROLL STRIPPING METHOD AND APPARATUS

The present invention relates to a method and apparatus for stripping and unwinding an indeterminate length of material such as film, sheets, threads and the like from a spool or other core bodies such as reels, bobbins and the like. More particularly, it relates to an apparatus for cutting the leader strip from a scroll and stripping and unwinding a scroll of film wound on a reel. In one embodiment the invention relates to a method and apparatus for stripping and unwinding a microfilm scroll from a reel which is encased and held captive in a film cartridge.

Microfilm is rapidly increasing in use for record keeping such as inventory control, computer printout records and the like. For convenience of storage and use, a scroll of film is wound on a reel or spool and is rotatably mounted and held captive in a cartridge. The cartridge or magazine maintains the film relatively dust-free during storage, is easily filed for reference, and can be readily positioned in a microfilm reader for reading the matter on the film or for printing out copies.

In general, one end of a strip of sturdy plastic film, such as 3-mil thick polyethylene terephthalate film is secured to the core of a captive reel or spool, with the other end of the strip extending through a port or opening in the cartridge to allow splicing of the microfilm scroll to the cartridge film strip end. The reel or core is then rotated to take up the scroll of film through the port into the cartridge. The last end of the film to be reeled is butt spliced with an adhesive-type tape to a leader strip of plastic such as polyethylene terephthalate film 5 mils in thickness. This "leader" tape strip protrudes from a port in the cartridge when the scroll is fully wound on the core to provide a readily available tab for guiding and advancing the film when it is to be lead through a microfilm reader.

Many of the microfilm scrolls have limited retention time utility, especially when used for inventory control, one-time readout or computer printout. The cartridge holders are costly, and economics dictate that they be reused as many times as possible. Also, the leader strip and the cartridge strip are somewhat expensive, and recovery and reuse of these items is also desirable.

Presently, the method in common use is to align a number of the cartridges containing film scrolls in a holder for the cartridges, all of the cartridges being arranged with their film ports juxtaposed. Each leader strip in turn is cut from its respective microfilm scroll by hand, and is placed in a container for reuse. The multiple strands of microfilm now projecting from the ports of the aligned cartridges are alternately gripped by the operator's two hands and pulled out foot by foot from the cartridges. If one scroll is shorter than the remaining ones, and runs out, the operator must realign his hands to grip and pull those scrolls still containing film. The scrolls are entirely unwound, down to the cartridge strip, leaving the cartridge strip captive on the reel ready for use with another scroll to be subsequently wound within the cartridge. The process is very tedious and time consuming.

Accordingly, it is an object of this invention to provide an apparatus and method for unwinding scrolls from film cartridges.

Another object of the present invention is to provide an apparatus and method for severing and separating the leader strip from the film and concurrently unwinding and guiding the scroll to a waste receptacle.

Other and further objects of the invention will be apparent and obvious from the following description and drawing of an illustrative embodiment, and various advantages not referred to herein will occur to those skilled in the art upon employment of the invention in practice.

One embodiment of the invention has been chosen for purposes of illustration and description and is shown in the accompanying drawing, forming a part of the specification, wherein:

FIG. 3 is a front elevational view of a portion of the apparatus showing the capstan roller, the idler or guide roller and cutting mechanism parts in nonoperating position and a portion of the film magazine and holder;

FIG. 4 is an end elevational view of a portion of the apparatus showing the capstan roll, the idler roll and cutting mechanism parts in nonoperating position and;

FIG. 5 is a schematic diagram of the electrical system of the apparatus.

Figure 1:
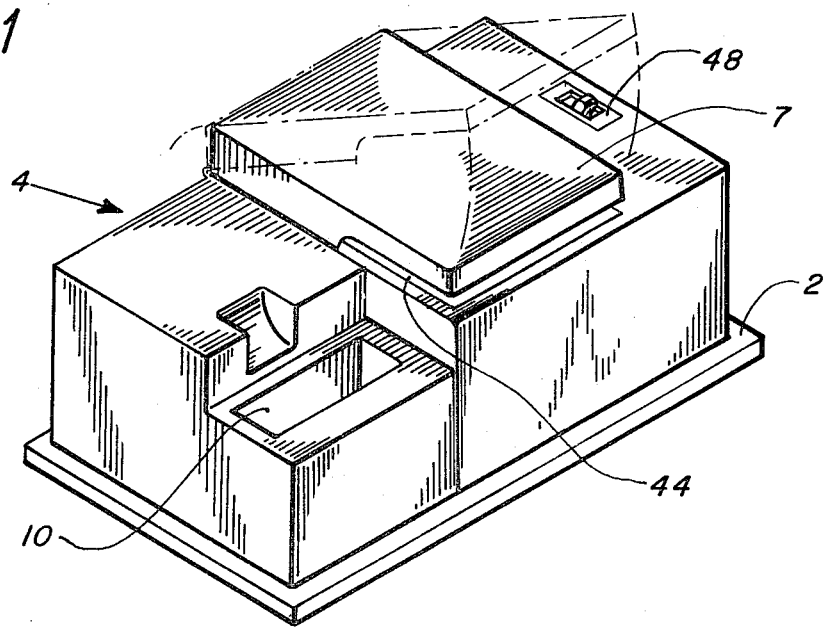
FIG. 1 is a perspective view illustrating the apparatus of the invention with the cover in position; and the lid shown closed; and in phantom, shown open.
Figure 2:
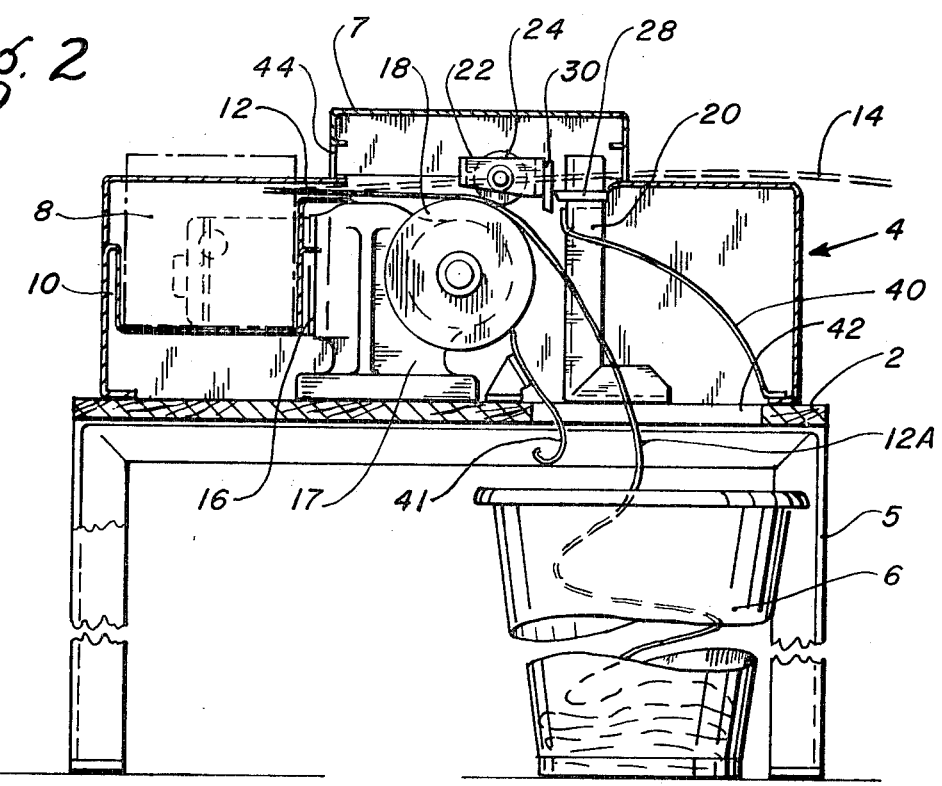
FIG. 2 is a front elevational view partly in section of one embodiment of the apparatus with a portion of the cover in section through a plane adjacent the line of film travel to show the relative position of the parts.

FIGS. 1 and 2 show an apparatus of this invention comprising a baseplate of platen 2, and a cover body shown generally as 4. The base 2 of the apparatus is mounted on a support frame 5, or can be placed on a tabletop to position it above a waste receptacle 6. A waste passage or aperture 42 in the baseplate 2 provides a passage for egress of the microfilm 12 from the apparatus to a waste receptacle 6.

A capstan or drive roll frame 17 is secured to baseplate 2. Mounted on capstan roll frame 17 is gearmotor 16 having an output drive shaft onto which is secured horizontally mounted capstan roll 18. Typically for the size 16 mm. and 35 mm. microfilm employed, the capstan roll 18 is 1 1/16 inches in width, is 4¼ inches in diameter, and is operated at about 1,750 r.p.m.

Refer now also to FIGS. 3 and 4. A cutter and idler roller mechanism is mounted on cutter pedestal 20 secured to base 2 and is arranged to cooperate with capstan roll 18. Secured to the guide surface or the horizontal top surface of pedestal 20 is a bed knife cutter blade 28. An idler roller 24 is rotatably mounted on shaft 26 secured to the bracket end of idler roller frame 22. Idler roller frame 22 is pivotally mounted on pedestal 20, and is trunnioned on pin 32. A moveable cutter blade 30 is secured to one edge of roller frame 22 to cooperate with fixed blade 28. The other end of frame 22 has an extended arm 29 linked to the armature of a push-type solenoid 36. An extension spring 38 is secured to base plate 2 and to the outboard end of arm 29, and is adjustably biased to raise roller 24 from the surface of capstan roll 18 when solenoid 36 is deenergized and is inoperative.

In operation, the cutting edges of fixed blade 28 and moveable blade 30 are urged together into a shearing contact by compression spring 34. As shown in FIG. 2 additionally, a shear cut in the film 14 positioned between cutter blades 28 and 30 is provided when solenoid 36 is energized and frame 22 pivots about pin 32, also moving idler roller 24 into mating contact with capstan roll 18. Idler roller 24 is preferably about 1 1/16 inches in width and 1 inch in diameter. Frame 22 is arranged to have roller 24 and capstan 18 in tangential engagement when solenoid 36 is energized. The locus of tangential engagement or nip between roll 18 and roller 24 is arranged to be horizontally below the bed knife 28 for reasons later described.

As shown in FIGS. 1 and 2, a cover body 4 is secured to base 2 and in turn provides for mounting cartridge holder 10. A film cartridge or magazine 8 is slidably mounted in holder 10 which in turn is secured to cover body 4. A lid portion 7, which can be integral with the cover body 4, or can be hinged and secured to cover body 4, has a film slot 44 provided therein so that prior to startup the film leader strip 14 and attached film 12 can be guided edgewise into alignment with the cutting and stripping mechanism.

A main switch 46 (See FIG. 5) is internally mounted on cover body 4 to control the electrical power supply to the apparatus. This switch is in a circuit with an auxiliary control switch 50 which provides for a fail-safe or safety disconnect if either the lid portion 7 is opened, or the cover body 4 is removed from the base 2. Also, secured to body 4 is a start-stop electrical switch 48 mounted adjacent the leader strip 14 position, for convenience in starting and stopping of the apparatus. It is to be understood that the cover 7 and cover body 4 are provided primarily for safety. The film guide or slot 44 shown in FIGS. 1 and 2 is provided by cooperation of the lid portion 7 and cover body 4, to permit initial positioning of the film on the capstan roll 18 and between the cutter blades 28 and 30. It will be apparent to those skilled in the art that other means for initial edge guiding of the film through the unwinding and cutting mechanism can be adapted to the apparatus. The leader film strip 14 is shown in phantom in FIG. 2 in position after it has been drawn from the cartridge 8 and led or slid through slot 44 prior to the start of the severing and unwinding operation. When so positioned, the start switch can then be manually activated to operate the apparatus.

When the apparatus is activated, the leader strip 14 is immediately severed from the film 12 by operation of cutter mechanism, and is manually withdrawn from guide slot 44 to be separately handled and used later on another scroll. Immediately after being severed from the leader strip 14, the cut lead end of film 12 is concurrently urged into the nip of the unwinding or stripping mechanism by engagement of roller 24 and capstan roll 18 whereby it is unwound from cartridge 8, as hereinafter described, and the waste film 12A is led to the waste passage 42 and thence to waste receptacle 6.

In FIG. 2 film cartridge 8 is shown in position with the holder 10 removed, and the film 12 as it is being stripped from the cartridge 8 by the nip between capstan roller 18 and idler roller 24; and is thereby deflected downwardly by the nip's oblique position and by the concave surface of waste deflector 40. Shown in phantom in FIG. 2 is the leader strip 14 and film 12 in the initial position before cutting and stripping from the cartridge is begun. As shown in FIG. 3, the moveable cutting blade 30 in the initial position is raised above the plane of the film 12, which is supported on pedestal bed knife 28 above the nip point of capstan roll 18 and idler roller 24. As shown, prior to the startup, the film leader strip 14 is advanced beyond the cutting edge of bed knife 28.

When the start-stop switch is closed, the capstan roll 18 begins to rotate, and the idler roller 24 and cutter frame 22 are pivotally moved downward by solenoid 36 whereby the shearing action between bed knife 28 and moveable cutting blade 30 severs the leader 14 from the disposable film 12. Simultaneously, in its downward movement, idler roller 24 engages film 12 and urges it toward the rotating surface of capstan roll 18 to the nip point contact between the two rolls. The film 12 having been severed continues to be urged by the idler roller 24 to the point of nip contact with the capstan roll 18, and is thereby advanced through the nip by the pressing engagement between the idler roller 24 and the capstan roll 18. Preferably the nip of the rollers is oblique to the horizontal or offset in advance of the vertical axis of the capstan roll 18 to cause the path of the film scroll to be deflected below the plane of the bed knife and cause the film 12 movement to be outwardly and downwardly directed to concave guide or deflector plate 40 and thence to an aperture or waste passage 42 in base 2 and thus to receptacle 6. During the stripping and unwinding of the scroll, the path of travel continues as shown in FIG. 2.

At times, because of the property of microfilm to curl in the direction in which it was wound on the reel in the cartridge 8, there is tendency for the cut film 12 at startup, to curl and be fed to cling and wind around the capstan roll 18. To minimize this, a film stripper-deflector 41 is arcuately shaped in the opposite direction to deflector plate 40 and to the film curl and travel, and is positioned on base 2 proximate the surface of the capstan roll 18 and below its horizontal axis to prevent the film from wrapping about the capstan roll 18. Once the stripping action has become effective, the movement and stiffness of the film continues to guide its path outwardly and downwardly through the paste passage 42 to the waste receptacle 6. It is apparent that the moveable cutter blade and the idler roller can also be arranged as separate mechanisms to move independently of each other, and that the moveable cutter blade can be operated upwardly and downwardly in a vertical plane instead of pivotally to obtain the same results. The nip pressure between the rolls 18, 24 is maintained at a level sufficient to strip the film 12 from the cartridge 8, but insufficient to pull the trailing end, secured in the cartridge and separate it from the cartridge reel.

When the scroll is fully stripped from the cartridge, except for the trailing tape end which is secured to the core of the cartridge, the forward movement of the film will stop. At that time the power to the apparatus can be turned off and the trailing end cut from the disposable scroll portion. In an alternate embodiment a limit switch 52 (schematically shown in FIG. 5 but now at the other FIGS.) is positioned on cover body 4 below the cartridge 8 in the cartridge holder 10. The limit switch is electrically connected in series with the run circuit. The weight of the filled cartridge 8 on the blade of the switch, holds the switch in the "on" position. When the scroll is fully stripped, the pulling force on the trailing end of the film snubbed about the core, causes the cartridge 8 to tilt, since the cartridge is placed in holder 10 in a manner that the film 12 is pulled from the port in an upper corner. Thus the cartridge tilt removes the weight on the blade of the limit switch, opens the circuit and turns off the electrical power.

The wiring diagram and electrical connections can be readily understood from FIG. 5 and the apparatus can be readily powered and wired by means known to those skilled in the art.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A method of unwinding a scroll of film from a core, said film having a leader tape connected thereto, and having a trailing tap connected thereto and to said core, which method comprises:
    a. rotatably securing said core;
    b. advancing at least said leader tape from said core, across the surface of an unwind capstan, to and through the path of a severing means;
    c. severing the film from said leader tape by said severing means;
    d. rotating said unwind capstan;
    e. urging said film away from said severed leader tape and into an unwinding engagement with said rotating capstan;
    f. unwinding said film from said core; and,
    g. arresting said unwinding by said core connected trailing tape.

2. The method in claim 1 wherein the steps of severing and urging said film are done concurrently by said severing means.

3. The method of claim 1 wherein step (b) is further characterized in that said leader tape is guided across and spaced above the surface of said unwind capstan.

4. A method of unwinding a scroll of microfilm from a film cartridge said microfilm having connected thereto a leader tape and a trailing tape secured to said cartridge which method comprises:
    a. securing said film cartridge in a holder;
    b. advancing said leader tape from said film cartridge across an unwind capstan, to and through an open cutter;
    c. severing said leader tape from said microfilm;
    d. rotating said unwind capstan and urging said severed microfilm into an unwinding engagement with said rotating capstan;
    e. unwinding said microfilm from said cartridge;
    f. arresting said unwinding when said trailing tape secured to said cartridge snubs said microfilm; and,
    g. disengaging said microfilm from said capstan.

5. An apparatus for unwinding an indeterminate length of film from a spool, comprising in combination:
    a. a frame;
    b. a capstan roll secured to said frame;
    c. means to drive said capstan roll;
    d. a pedestal secured to said frame, positioned adjacent to and spaced from said capstan roll, and having a guide surface thereon;

e. severing means positioned intermediate the guide surface of the pedestal and the capstan roll;

f. means to move said severing means between a dwell position and at least to a plane with the guide surface;

g. an idler roll positioned intermediate the severing means and the capstan roll; and, h. means to move said idler roll to tangential contact with the capstan roll disposed from the central plane of the capstan roll, and to a position removed therefrom whereby there is provided a path for advancing film from a position above the surface of the capstan roll to the guide surface of the pedestal.

6. The apparatus in claim 5 wherein a cover is provided for said capstan roll, said severing means, said pedestal, and said idler roller, said cover having a slot therein to guide the film to a position above the surface of the capstan, through and to the guide surface of the pedestal.

7. The apparatus in claim 5 wherein said severing means are cutter blades.

8. The apparatus in claim 5 wherein the idler roll is positioned in a frame and wherein the severing means are cutter blades comprised of cooperating blades positioned on the edge of the pedestal guide surface and on the edge of the idler roll frame.

9. The apparatus in claim 5 wherein in the nonoperative position there is a straight line uninterrupted path from the top surface of the capstan roll to the guide surface on the pedestal.

10. The apparatus of claim 5 wherein means to move the severing means, and means to move the idler roll operate concurrently.

11. In an apparatus for unwinding a scroll of microfilm from a film cartridge said microfilm having connected thereto a leader tape and a trailing end secured to said cartridge:

a. a platen having mounted thereon a cutter pedestal, an unwind capstan, and a cover body;

b. a shear cutter mounted on said cutter pedestal;

c. means for securing said film cartridge to said cover body;

d. means for positioning said leader tape from said cartridge to and through said shear cutter in open position, with said tape being spaced from and aligned with said unwind capstan;

e. means to open and close said shear cutter;

f. idler roller means adapted to urge said microfilm against said unwind capstan concurrently with the operation of closing said shear cutter, whereby said leader tape is severed from said microfilm;

g. means to operate said unwind capstan concurrently with said means to close said shear cutter, whereby said capstan and idler roller means withdraw the microfilm from said cartridge, after said leader tape is severed;

h. means to guide said microfilm to a waste receptacle; and, i. means to halt said capstan and to open said cutter and idler roller means when said microfilm is snubbed by the trailing end of the film secured to the film cartridge.

12. The apparatus in claim 11 wherein the means for guiding and positioning the leader tape through the open shear cutter is an open slot in said cover.

13. The apparatus in claim 11 wherein the idler roller means is positioned between the cutter pedestal and the capstan roll and a concave guide is provided at the base of the pedestal to guide said microfilm through an aperture provided in said platen.

14. The apparatus in claim 13 wherein the idler roller means is rotatably mounted in a frame and a blade is secured to said frame to cooperate with a blade secured to said cutter pedestal to sever said leader tape.

* * * * *